(12) United States Patent
Chi

(10) Patent No.: US 6,218,786 B1
(45) Date of Patent: Apr. 17, 2001

(54) LAMP STRING CONTROLLING DEVICE

(76) Inventor: Cheng Ching Chi, Fl. 9, No. 250-1, Sec. 2, JinCheng Rd., Tucheng City, Taipei (TW)

( * ) Notice: Subject to any disclaimer, the term of this patent is extended or adjusted under 35 U.S.C. 154(b) by 0 days.

(21) Appl. No.: 09/515,204

(22) Filed: Feb. 29, 2000

(51) Int. Cl.$^7$ .................................................. H05B 37/00
(52) U.S. Cl. .................................. 315/185 R; 315/185 S; 315/193
(58) Field of Search ........................... 315/185 R, 185 S, 315/193, 314, 324

(56) References Cited

U.S. PATENT DOCUMENTS 5,300,864 * 4/1994 Allen ...................................... 315/314

* cited by examiner

Primary Examiner—David Vu

(74) Attorney, Agent, or Firm—Rosenberg, Klein & Lee

(57) ABSTRACT

A lamp string controlling device includes a power supply circuit constituted by a transformer and a rectification circuit for converting an alternate current into a direct current. A harmonic oscillation circuit is connected between the transformer and the rectification circuit for eliminating noise and electromagnetic interference. A single chip based control circuit is connected between the power supply circuit and a driver circuit which drives a lamp string. The control circuit controls the lighting status of the lamp string between a full load condition and a non-full load condition in a variety of styles. A timing circuit having a time constant is coupled to the control circuit for switching the lamp string from a full load condition to the non-full load condition after a time period determined by the time constant thereof whereby overall power consumption of the lamp string may be lowered down and thus a small-sized transformer suffices for the operation of the lamp string. Therefore a compact lamp string controlling device may be formed by combining the power supply circuit and the control circuit together. A manual switch and a remote control module may be coupled to the control circuit for manual and remote control.

20 Claims, 6 Drawing Sheets

LAMP STRING CONTROLLING DEVICE

FIELD OF THE INVENTION

The present invention generally relates to a lamp string controlling device, and in particular to a lamp string controlling device capable to controlling a lamp string composed of a multiplicity of loops.

BACKGROUND OF THE INVENTION

Lamp strings have been widely used in all kinds of celebrations and festivals. The lamp strings are attached to for example trees along a street. The lamp strings are powered by electricity and controlled by a controlling device to change the lighting status of the lamps.

Conventionally, the lamp strings are usually set to the full load condition without any time limits. Thus, a great consumption of power is encountered. Furthermore, to support such a great power consumption, a large-sized transformer is required. Therefore, the overall size of a lamp string controlling device may have a large size that is not suitable for outdoor use.

Furthermore, due to the large size of the power supply circuit, it is common that the power supply circuit and a control circuit are separated from each other with wires connected therebetween. This increases the cost and space requirement in installing the lamp string.

In addition, the lamp string controlling device is easily subject to electromagnetic interference. A high frequency filter may be connected between the power supply circuit and the control circuit to overcome the electromagnetic interference. The filter, however, increases the size and the cost of the lamp string controlling device.

Besides, the conventional control circuit may only control the lighting status of the lamp string in a limited ways. This is not consumer appealing.

It is thus desirable to have a lamp string controlling device that overcomes the above problems.

SUMMARY OF THE INVENTION

Accordingly, an object of the present invention is to provide a lamp string controlling device comprising a timing circuit for switching the lamp string from a full load condition to a non-full load condition after a predetermined time period for lowering down power consumption and reducing the required size of the transformer thereby allowing the power supply circuit and a control circuit to be combined together.

Another object of the present invention is to provide a lamp string controlling device in which a power supply circuit and a control circuit are combined together whereby wire connection therebetween is shortened and electromagnetic interference is reduced.

A further object of the present invention is to provide a lamp string controlling device comprising a control circuit capable to control the lighting status of lamp strings connected thereto in a variety of styles.

A further object of the present invention is to provide a lamp string controlling device comprising a manual switch and/or a remote control module for manual or remote control of the lamp string controlling device.

To achieve the above objects, in accordance with the present invention, there is provided a lamp string controlling device comprising a power supply circuit constituted by a transformer and a rectification circuit for converting an alternate current into a direct current. A harmonic oscillation circuit is connected between the transformer and the rectification circuit for eliminating noise and electromagnetic interference. A single chip based control circuit is connected between the power supply circuit and a driver circuit which drives a lamp string. The control circuit controls the lighting status of the lamp string between a full load condition and a non-full load condition in a variety of styles. A timing circuit having a time constant is coupled to the control circuit for switching the lamp string from a full load condition to the non-full load condition after a time period determined by the time constant thereof whereby overall power consumption of the lamp string may be lowered down and thus a small-sized transformer suffices for the operation of the lamp string. Therefore a compact lamp string controlling device may be formed by combining the power supply circuit and the control circuit together. A manual switch and a remote control module may be coupled to the control circuit for manual and remote control.

BRIEF DESCRIPTION OF THE DRAWINGS

The present invention will be apparent to those skilled in the art by reading the following description of preferred embodiments thereof, with reference to the accompanying drawings, in which.

DETAILED DESCRIPTION OF THE PREFERRED EMBODIMENT

Figure 1:
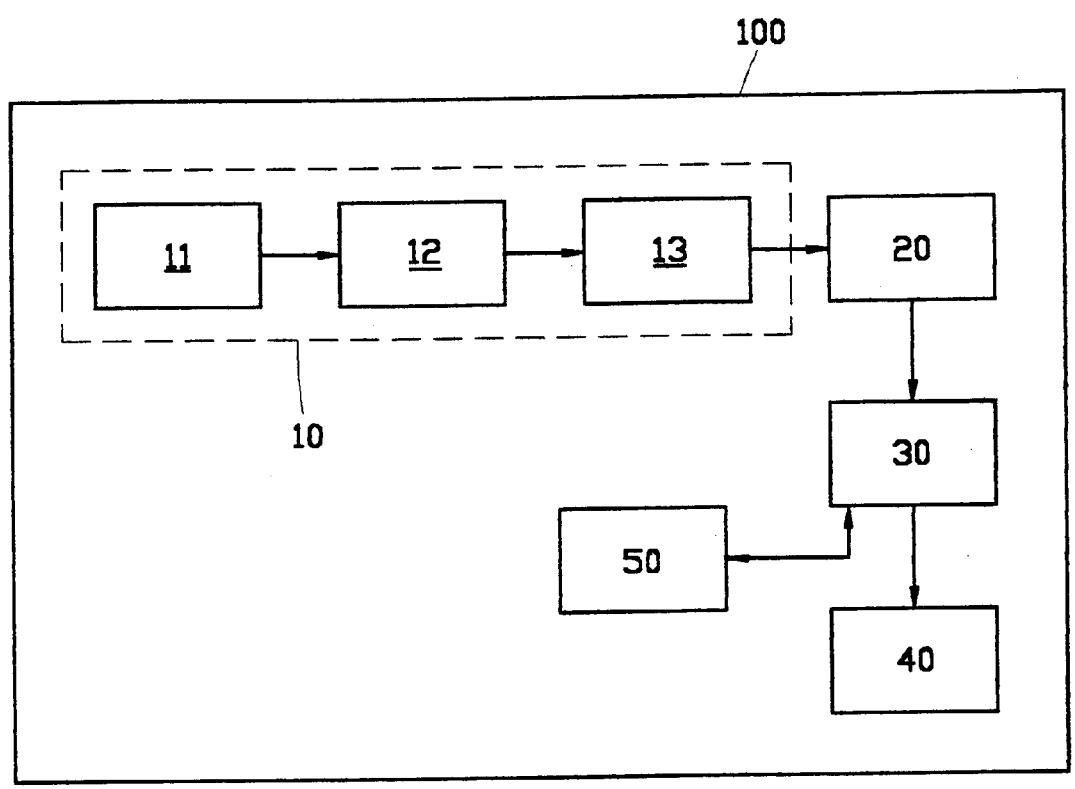
FIG. 1 is a system block diagram of a lamp string controlling device in accordance with a first embodiment of the present invention.

With reference to the drawings and in particular to FIG. 1, wherein a lamp string controlling device constructed in accordance with a first embodiment the present invention, generally designated by reference numeral 100, is shown, the lamp string controlling device 100 comprises a power supply circuit 10 receiving an alternate current from for example a wall outlet of an electric main (not shown) and converting the alternate current into a direct current for powering the lamp string controlling device 100. The power supply circuit 10 comprises a transformer 11, a harmonic oscillation circuit 12 and a rectification circuit 13.

The transformer 11 converts the alternate current having a first (high) voltage from the electric main into an alternate current of a second (low) voltage lower than the first voltage. The harmonic oscillation circuit 12 is coupled between a secondary winding of the transformer 11 and the rectification circuit 13 for eliminating electromagnetic interference and suppressing noise whereby the rectification circuit 13 which is to convert the alternate current of second voltage into a direct current may supply a stable and not-interfered direct current to the lamp string controlling device 100.

A control circuit 20 controls the operation and lighting status of a lamp string 40 electrically connected to the lamp string controlling device 100, including the ON/OFF status, the brightness, cycling, alternate sparkling. The control circuit 20 may include automatic control, manual control and remote control. A driver circuit 30 is coupled between the control circuit 20 and the lamp string 40 whereby the lamp string 40 is driven by the driver circuit 30 controlled by the control circuit 20. The lamp string 40 may comprise a single loop of lamp string. Preferably, the lamp string 40 comprises multiple loops, such as four loops in the embodiment illustrated.

A timing circuit 50 is coupled to the control circuit 20 for controlling the operation thereof. For example, when the lamp string 40 is in a full load condition, namely all the lamps thereof being lightened, the timing circuit 50 starts a timing operation and once a predetermined period of time is reached, a switching signal generated by the timing circuit 50 is applied to the control circuit 20 to cause the control circuit 20 to change the lamp string 40 to a non-full load condition. This is advantageous in that the rating power value (volt-ampere or watt value) of the transformer 11 may be lowered down but still sufficient to maintain the operation of the lamp string 40. For example, if the full load condition of the lamp string 40 requires a power of 36 watts, then the transformer 11 may be selected to be of a rating power value of 20 watts. This helps to reduce the size of the transformer 11 and may thus allow the power supply circuit 10, the control circuit 20, the driver circuit 30 and the timing circuit 50 to be combined together as a single unit.

The transformer 11 may be a high frequency transformer or a ring transformer which further reduces the size of the lamp string controlling device 100.

Figure 2:
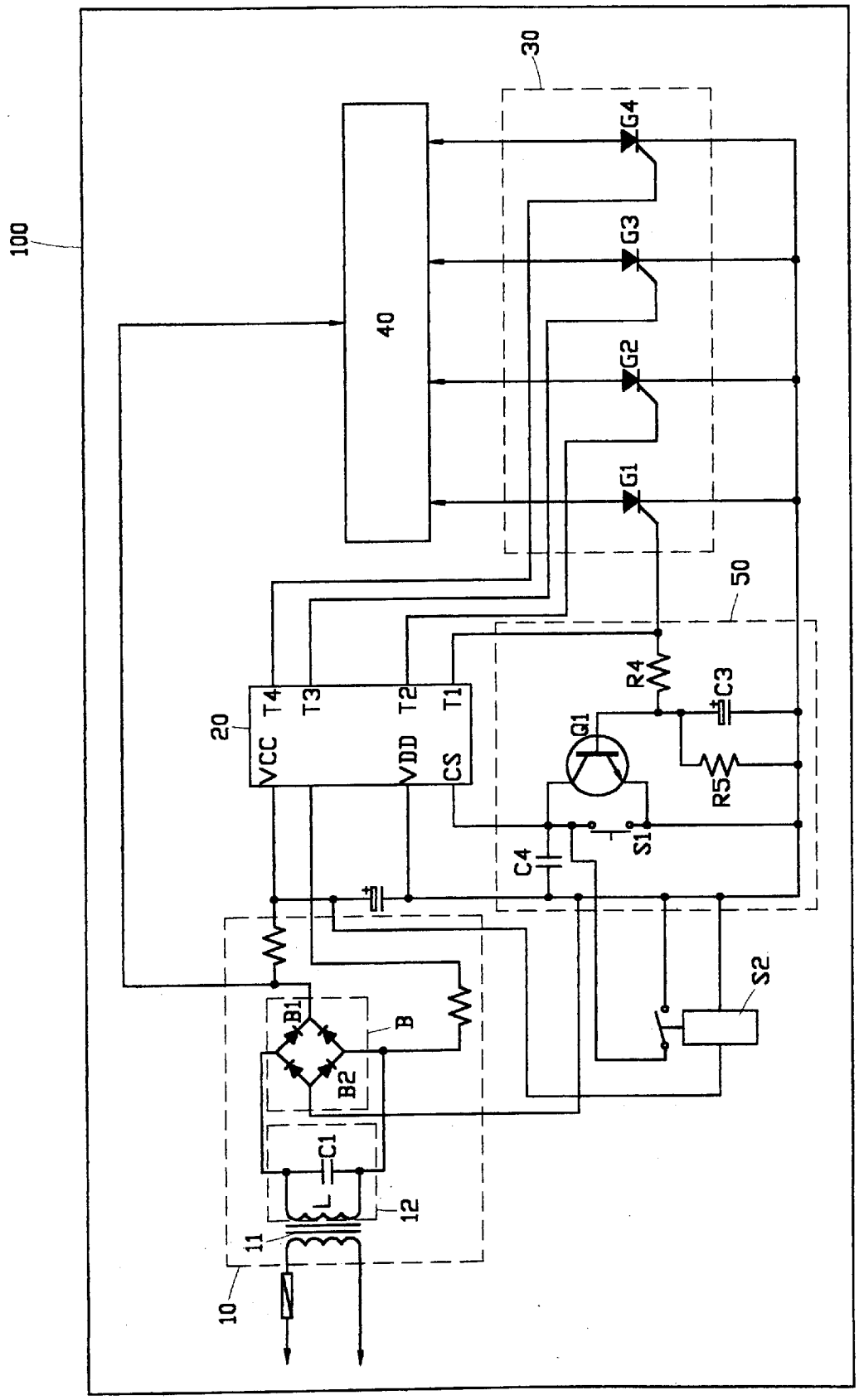
FIG. 2 is a circuit diagram of the lamp string controlling device of the first embodiment of the present invention.

Also referring to FIG. 2, which shows a detailed circuit diagram of the lamp string controlling device 100, the harmonic oscillation circuit 12 of the power supply circuit 10 comprises a secondary winding L of the transformer 11 and a capacitor C1 for eliminating high frequency electromagnetic interference. The rectification circuit comprises a bridge rectifier circuit B having output terminals B1, B2 respectively representing positive and negative poles for supplying a stable direct current.

In the embodiment illustrated in FIG. 2, the control circuit 20 is embodied as a single chip integrated circuit. Power terminals VCC and VDD of the control circuit 20 are connected to the output terminals B1, B2 of the bridge rectifier circuit B of the power supply circuit 10 to receive power therefrom. The control circuit 20 comprises a plurality of output terminals T1, T2, T3, T4 for supplying display control signals to the driver circuit 30 and a switch control terminal CS for receiving the switching signal from the timing circuit 50.

Furthermore, a manual switch SI and a radio receiver (remote control) module S2 are also connected to the switch control terminal CS for manual control and remote control of the control circuit 20.

The driver circuit 30 comprises thyristor elements G1, G2, G3, G4 respectively connected to the output terminals T1, T2, T3, T4 of the control circuit 20 for controlling the triggering phase in order to individually controlling the ON/OFF status of each loop of the lamp string 40. It is noted that the lamp string 40 comprises four loops respectively associated with the four thyristor elements G1, G2, G3, G4.

Example of the thyristor elements G1, G2, G3, G4 may comprise silicon controlled rectifier having a gate connected to the output terminal of the control circuit 20.

Figure 3:
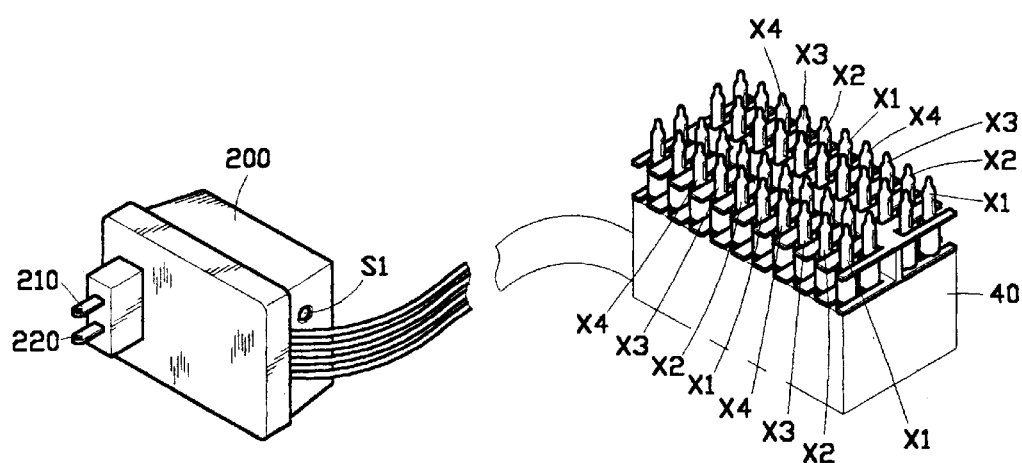
FIG. 3 is a perspective view of the lamp string controlling device of the first embodiment of the present invention.

In the embodiment illustrated in FIG. 3, the timing circuit 50 comprises a transistor Q1 resistors R4, R5 and capacitors C3, C4. The resistors R4, R5 and the capacitor C3 determine the time constant of the timing circuit 50. In a preferred embodiment of the present invention, the time constant is set between 10 and 30 second. This time constant corresponds to a time period in which the transformer 11 and the rectification circuit 13 are allowed to be overloaded when the lamp string 40 is in full load condition. In other words, the transformer 11 may not be damaged due to overload within such a time period. The resistor R4 is also connected to the output terminal T1 of the control circuit 20 for detecting a full load condition of the lamp string 40. As mentioned above, when a full load condition is detected, the timing circuit 50 is actuated. Once the timing circuit 50 reaches a predetermined time period determined by the time constant, the transistor Q1 having a collector connected to the switching control terminal CS of the control circuit 20 generates and applies the switching signal to the switching control terminal CS of the control circuit 20 for switching the output terminals T1, T2, T3, T4 to a non-full load condition, namely the lamp string 40 is not fully lightened thereby lowering down the power consumption of the lamp string 40 back to the rating power value of the transformer 11.

Also referring to FIG. 3, a perspective view of the lamp string controlling device 100 in accordance with a first embodiment of the present invention is shown. In accordance with the present invention, the size of the transformer 11 may be reduced by using the timing circuit 50 to control the control circuit 20 for limiting the full load condition of the lamp string 40. This allows the power supply circuit 10, the control circuit 20, the driver circuit 30 and the timing circuit 50 to be housed in a single common casing 200. Two contact blades 210, 220 extend beyond the casing 200 for connection with an electric main. Preferably, the contact blades 210, 220 are arranged in a style similar to a regular electric plug.

The manual switch S1 may be mounted on the casing 200 for user's access and the remote control module S2 may be arranged inside the casing 200 for controlling the control circuit 20.

In the embodiment illustrated in FIG. 3, the lamp string 40 comprises four loops, namely X1, X2, X3, X4 which are arranged to be cyclic and alternate with each other. It is noted that the lamp loops X1, X2, X3, X4 may be arranged in any desired fashion. The lamp loops X1, X2, X3, X4 are respectively connected to the output terminals T1, T2, T3, T4 of the control circuit 20.

The control circuit 20 may be operated in a variety of different ways. An example of a eight-phase control is shown as follows:

(1) automatically and cyclically demonstrating the following phases (2)–(8).

(2) alternately decreasing/increasing brightness of the loops X1–X4 of the lamp string 40 to show a wavy-like fashion.

(3) sequentially and cyclically lightening the four loops X1–X4 of the lamp string 40.

(4) the brightness of each loop X1, X2, X3, X4 of the lamp string 40 sequentially decreased and then increased.

(5) the loops X1–X4 of the lamp string 40 being randomly lightened.

(6) the brightness of the loops X1–X4 gradually decreased and then suddenly changed to full brightness simultaneously.

(7) the loops X1–X4 irregularly sparkling (8) the loops X1–X4 in full brightness for 10–30 seconds and then switched to phase (1).

The above sequence is performed on the basis of automatic control. In other words, the manual switch S1 and the remote control module S2 are not actuated. The manual switch S1 or the remote control module S2 may be used to interrupt any one of the above eight phases. If desired, a circuit associated with the manual switch S1 and the remote control module S2 may be incorporated so that each time the manual switch S1 is turned off and then turned on or the remote control module S2 is actuated, the above operation sequence may be shifted to a next phase. For example, a user may directly jump to phase five by actuating the remote control module S2 five times. The phases may run cyclically so that when a user actuates the remote control module S2 nine times, the operation is switched back to the first phase.

It is noted that in the above operation process, the lamp string 40 may only be overloaded in phases 6 and 8, while in other phases, the lamp string 40 is not overloaded.

Figure 4:
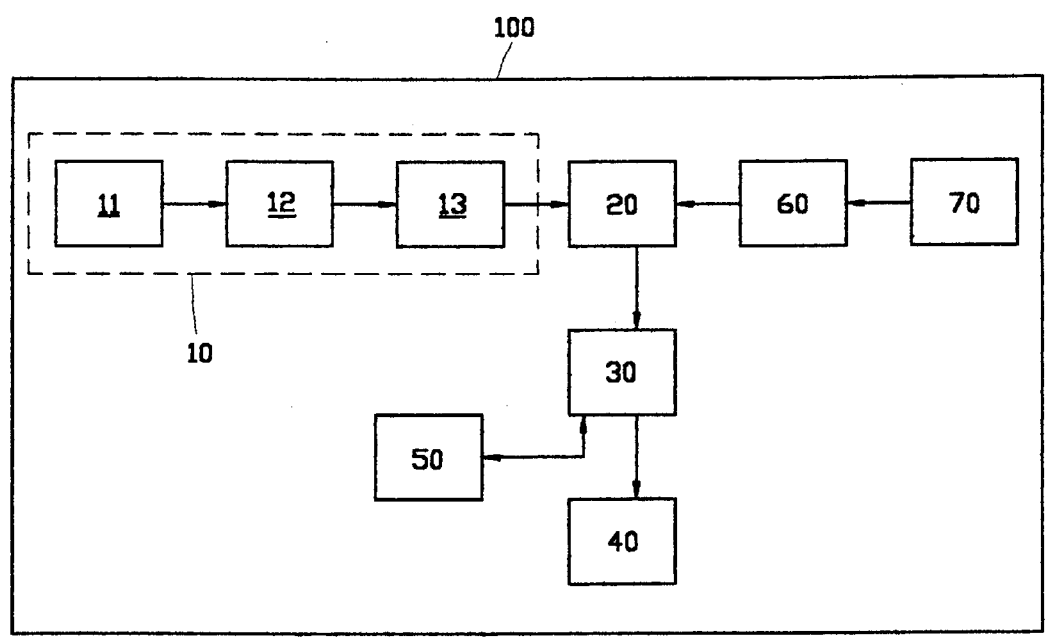
FIG. 4 is a system block diagram of a lamp string controlling device accordance with a second embodiment of the present invention.
Figure 5:
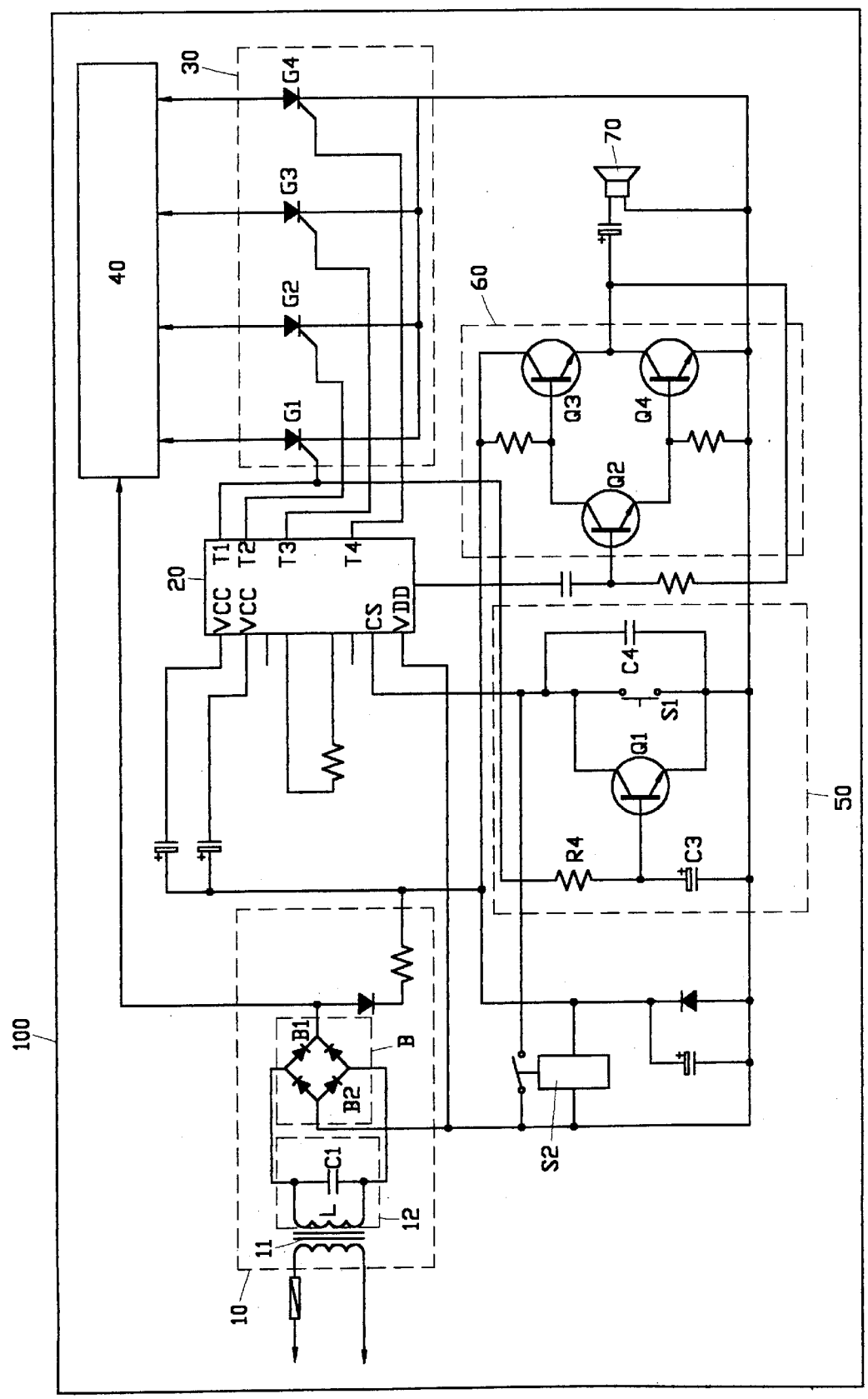
FIG. 5 is a circuit diagram of the lamp string controlling device of the second embodiment of the present invention.

Referring to FIGS. 4–5, a second embodiment of the lamp string controlling device 100 of the present invention is shown. The difference between the embodiment of FIGS. 1–3 and that of FIGS. 4–5 is that a voice circuit 60 and a speaker 70 are incorporated in the second embodiment of FIGS. 4–5 for providing voice/music playing function.

As shown in FIG. 5, the voice circuit 60 that is controlled by the control circuit 20 is connected to a voice signal output terminal P1 of the control circuit 20. The voice circuit 60 comprises transistors Q2, Q3, Q4 forming an amplification circuit for driving the speaker 70 to play voice or music.

Figure 6:
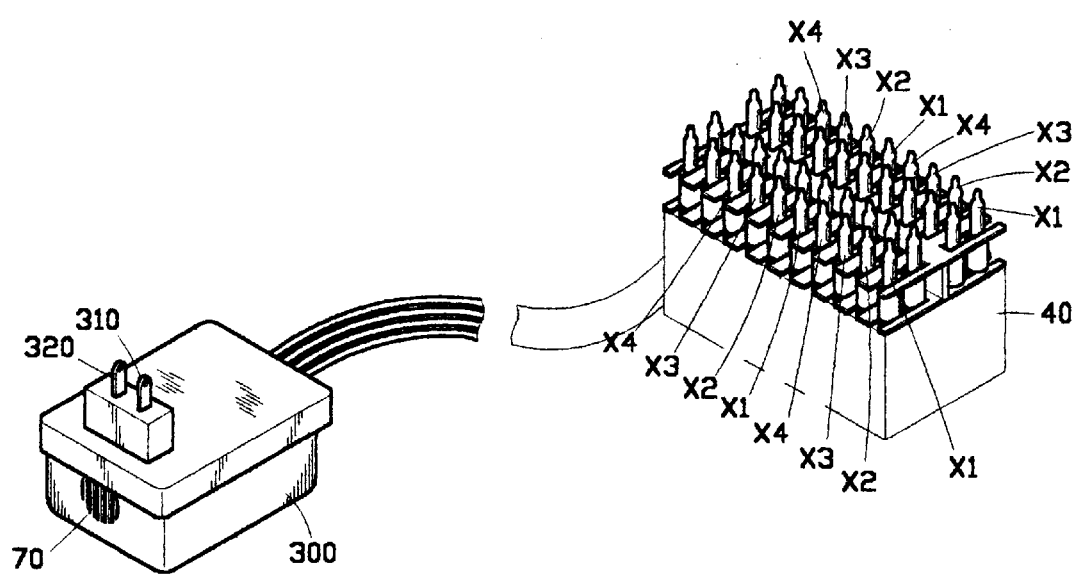
FIG. 6 is a perspective view of the lamp string controlling device of the second embodiment of the present invention.

Also referring to FIG. 6, a perspective view of the lamp string controlling device 100 of second embodiment is shown. As discussed above, the size of the transformer 11 may be reduced due to the use of the timing circuit 50 associated with the control circuit 20 for limiting the full load condition of the lamp string 40. Thus, the power supply circuit 10, the control circuit 20, the driver circuit 30, the timing circuit 50, the voice circuit 60 and the speaker 70 may be housed in a single common casing 300. Two contact blades 310, 320, similar to the contact blade 210, 220 of the first embodiment shown in FIGS. 1–3, extend beyond the casing 300 for connection with an electric main. The manual switch SI and the remote control module S2 are similar to the counterpart of the first embodiment whereby no further description is needed. The arrangement of the loops X1–X4 of the lamp string 40 in the second embodiment is similar to that of the first embodiment.

The control circuit 20 of the lamp string controlling device 100 of the second embodiment may be operated in a variety of different ways. An example of a seven-phase control is shown as follows:

(1) the loops X1–X4 of the lamp string 40 sparkling simultaneously.

(2) the loops X1–X4 of the lamp string 40 sparkling alternately.

(3) the loops X1–X4 of the lamp string 40 sequentially and cyclically lightened.

(4) the loops X1–X4 of the lamp string 40 divided into two sets which sequentially and cyclically lightened.

(5) repeating phases (1)–(4) with music played simultaneously.

(6) repeating phases (1)–(4) without music.

(7) changing the loops X1–X4 of the lamp string 40 to full brightness for 10–30 seconds and then switched to phase (1).

The lamp string controlling device of the present invention as described above has the following advantages:

(1) the overall size is significantly reduced thereby suitable for outdoor operation.

(2) the power supply circuit and the control circuit are combined together and an oscillation circuit is incorporated in the power supply circuit thereby reducing noise of electromagnetic interference.

(3) the lightening sequence/fashion of the lamp string may be varied arbitrarily and music may be incorporated in the operation thereof.

(4) manual control and remote control are incorporated.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A lamp string controlling device comprising:
   a power supply circuit comprising a transformer, an oscillation circuit and a rectification circuit for converting an alternate current power input into a direct current power output;
   a control circuit comprising a switch control terminal for receiving a switching signal and output terminals for generating display control signals;
   a driver circuit connected to the control circuit for receiving the display control signals and in response thereto separately driving loops of a lamp string, the loops being connected to the driver circuit; and
   a timing circuit having a time constant and connected to one of the output terminals of the control circuit for detection of full load condition of the lamp string, the timing circuit having an output terminal connected to the switch control terminal of the control circuit whereby when the full load condition of the lamp string is detected, the timing circuit generates and applies the switching signal to the switch control terminal of the control circuit after a time period determined by the time constant for switching the lamp string to a non-full load condition.

2. The lamp string controlling device as claimed in claim 1, wherein the transformer has a power rating value smaller than power consumption of the lamp string in the full load condition.

3. The lamp string controlling device as claimed in claim 1, wherein the transformer of the power supply circuit comprises a high frequency transformer.

4. The lamp string controlling device as claimed in claim 1, wherein the transformer of the power supply circuit comprises a ring transformer.

5. The lamp string controlling device as claimed in claim 1, wherein the harmonic oscillation circuit of the power supply circuit comprises a secondary winding of the transformer and a capacitor.

6. The lamp string controlling device as claimed in claim 1, wherein the rectification circuit comprises a bridge rectifier circuit.

7. The lamp string controlling device as claimed in claim 1, wherein the control circuit is embodied in a single chip integrated circuit.

8. The lamp string controlling device as claimed in claim 1, wherein a manual switch is connected to the switch control terminal of the control circuit for manual control of the control circuit.

9. The lamp string controlling device as claimed in claim 1, wherein a remote control module is connected to the switch control terminal of the control circuit for remote control of the control circuit.

10. The lamp string controlling device as claimed in claim 1, wherein the control circuit has a voice signal output terminal to which a voice circuit is connected for driving a speaker connected to the voice circuit.

11. The lamp string controlling device as claimed in claim 10, wherein the voice circuit comprises a plurality of transistors.

12. The lamp string controlling device as claimed in claim 1, wherein the time period determined by the time constant of the timing circuit is 10–30 seconds.

13. The lamp string controlling device as claimed in claim 1, wherein the timing circuit comprises at least a transistor, a resistor and a capacitor.

14. The lamp string controlling device as claimed in claim 13, wherein the time constant of the timing circuit is determined by the resistor and the capacitor.

15. The lamp string controlling device as claimed in claim 13, wherein the transistor has a collector connected to the switch control terminal of the control circuit for controlling the switching of the control circuit.

16. The lamp string controlling device as claimed in claim 1, wherein the driver circuit comprises a plurality of thyristors.

17. The lamp string controlling device as claimed in claim 16, wherein the thyristors comprise silicon controlled rectifiers.

18. The lamp string controlling device as claimed in claim 17, wherein each silicon controlled rectifier has a gate connected to a corresponding one of the output terminals of the control circuit.

19. The lamp string controlling device as claimed in claim 1, wherein the power supply circuit, the control circuit, the driver circuit and the timing circuit are commonly housed in a single casing.

20. The lamp string controlling device as claimed in claim 19 further comprising two contact blades extending beyond the casing for functioning as an electrical plug.

* * * * *